(12) United States Patent
Jiang (10) Patent No.: US 9,237,430 B2
(45) Date of Patent: Jan. 12, 2016

(54) FLASH CALLER ID FOR ROAMING

(75) Inventor: Yue Jun Jiang, Danville, CA (US)

(73) Assignee: MOBILEUM, INC., Santa Clara, CA (US)

( * ) Notice: Subject to any disclaimer, the term of this patent is extended or adjusted under 35 U.S.C. 154(b) by 625 days.

(21) Appl. No.: 11/250,160

(22) Filed: Oct. 12, 2005

(65) Prior Publication Data

US 2006/0135213 A1 Jun. 22, 2006

Related U.S. Application Data

(60) Provisional application No. 60/618,500, filed on Oct. 12, 2004.

(51) Int. Cl.
*H04M 3/42* (2006.01)
*H04W 4/20* (2009.01)
*H04M 1/57* (2006.01)

(52) U.S. Cl.
CPC .. *H04W 4/20* (2013.01); *H04M 1/57* (2013.01)

(58) Field of Classification Search
CPC ......... H04W 4/16; H04W 92/02; H04W 4/20;
H04W 76/022; H04W 84/042; H04W 8/18;
H04W 8/20; H04M 1/57; H04M 1/576;
H04M 3/42042; H04M 3/42059; H04M 15/06;
H04M 3/436; H04M 3/48; H04M 3/42093;
H04M 3/42068; H04M 1/72552; H04M
3/42195; H04M 3/4365; H04M 3/42034;
H04M 3/42051; H04M 1/64; H04M 1/65;
H04M 3/2281; H04M 3/4288
USPC ........ 455/415, 466, 432.1, 432.2, 432.3, 433,
455/413, 445, 414.1, 412.2, 419; 705/39,
705/43; 709/202, 219; 379/142.04, 142.06,
379/142.07, 93.23, 114.01; 370/342, 352,
370/395.3
See application file for complete search history.

(56) References Cited

U.S. PATENT DOCUMENTS

| | | |
|---|---|---|
| 5,353,328 A | 10/1994 | Jokimies |
| 5,586,166 A | 12/1996 | Turban |
| 5,742,910 A | 4/1998 | Gallant et al. |
| 5,764,730 A | 6/1998 | Rabe et al. |
| 5,818,824 A | 10/1998 | Lu et al. |
| 5,854,982 A | 12/1998 | Chambers et al. |
| 5,901,359 A | 5/1999 | Malmstrom |

(Continued)

FOREIGN PATENT DOCUMENTS

| | | |
|---|---|---|
| CA | 2281041 A1 | 2/2001 |
| EP | 0899 974 A2 | 3/1999 |

(Continued)

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 287 V8.3.0, XX, XX, Aug. 2000, pp. 1-69 and pp. 114-115 (XP-002222021).

(Continued)

*Primary Examiner* — Fred Casca
(74) *Attorney, Agent, or Firm* — Arent Fox LLP (57) ABSTRACT

The present invention relates to methods and apparati for presenting and displaying caller-identifying information to outbound roamers using means outside of the visited network's facility, or communications channels outside of the call path.

15 Claims, 6 Drawing Sheets

(56) References Cited

U.S. PATENT DOCUMENTS

| | | | |
|---|---|---|---|
| 5,903,832 A | 5/1999 | Seppanen et al. |
| 5,930,701 A | 7/1999 | Skog |
| 5,940,490 A | 8/1999 | Foster et al. |
| 5,943,620 A | 8/1999 | Boltz et al. |
| 5,953,653 A | 9/1999 | Josenhans et al. |
| 5,987,318 A | 11/1999 | Alperovich et al. |
| 5,987,323 A | 11/1999 | Huotari |
| 5,987,325 A | 11/1999 | Tayloe |
| 6,014,561 A | 1/2000 | Mölne |
| 6,052,604 A | 4/2000 | Bishop et al. |
| 6,058,309 A | 5/2000 | Huang et al. |
| 6,075,855 A | 6/2000 | Christiansen et al. |
| 6,085,084 A | 7/2000 | Christmas |
| 6,138,005 A | 10/2000 | Park |
| 6,138,009 A | 10/2000 | Birgerson |
| 6,148,197 A | 11/2000 | Bridges et al. |
| 6,163,701 A | 12/2000 | Saleh et al. |
| 6,185,295 B1 | 2/2001 | Frederiksen et al. |
| 6,185,436 B1 | 2/2001 | Vu |
| 6,192,255 B1 | 2/2001 | Lewis et al. |
| 6,195,532 B1 | 2/2001 | Bamburak et al. |
| 6,208,864 B1 | 3/2001 | Agrawal et al. |
| 6,212,372 B1 | 4/2001 | Julin |
| 6,356,755 B1 | 3/2002 | Valentine et al. |
| 6,356,756 B1 | 3/2002 | Koster |
| 6,456,845 B1 | 9/2002 | Drum et al. |
| 6,456,859 B1 | 9/2002 | Desblancs et al. |
| 6,463,298 B1 | 10/2002 | Sorenson et al. |
| 6,466,786 B1 | 10/2002 | Wallenius |
| 6,505,050 B1 | 1/2003 | Brudos et al. |
| 6,515,974 B1 | 2/2003 | Inoue et al. |
| 6,574,481 B1 | 6/2003 | Rathnasabapathy et al. |
| 6,603,761 B1 | 8/2003 | Wang et al. |
| 6,603,968 B2 | 8/2003 | Anvekar et al. |
| 6,611,516 B1 | 8/2003 | Pirkola et al. |
| 6,628,934 B2 | 9/2003 | Rosenberg et al. |
| 6,636,502 B1 | 10/2003 | Lager et al. |
| 6,671,523 B1 | 12/2003 | Niepel et al. |
| 6,684,073 B1 | 1/2004 | Joss et al. |
| 6,693,586 B1 | 2/2004 | Walters et al. |
| 6,738,622 B1 | 5/2004 | Heutschi et al. |
| 6,738,636 B2 | 5/2004 | Lielbridis |
| 6,764,003 B1 | 7/2004 | Martshitsch et al. |
| 6,782,264 B2 | 8/2004 | Anderson |
| 6,795,444 B1 | 9/2004 | Vo et al. |
| 6,856,818 B1 | 2/2005 | Ford |
| 6,876,860 B1 | 4/2005 | Berg et al. |
| 6,920,487 B2 | 7/2005 | Sofer et al. |
| 6,925,299 B1 | 8/2005 | Sofer et al. |
| 6,961,559 B1 | 11/2005 | Chow et al. |
| 6,963,543 B2 | 11/2005 | Diep et al. |
| 6,968,383 B1 | 11/2005 | Heutschi et al. |
| 6,975,852 B1 | 12/2005 | Sofer et al. |
| 6,978,156 B1 | 12/2005 | Papadopoulos et al. |
| 7,020,479 B2 | 3/2006 | Martschitsch |
| 7,139,570 B2 | 11/2006 | Elkarat et al. |
| 7,184,764 B2 | 2/2007 | Raviv et al. |
| 7,231,431 B2 | 6/2007 | Sofer et al. |
| 2002/0009199 A1 | 1/2002 | Ala-Laurila et al. |
| 2002/0012351 A1 | 1/2002 | Sofer et al. |
| 2002/0037708 A1 | 3/2002 | McCann et al. |
| 2002/0087631 A1 | 7/2002 | Sharma |
| 2002/0101858 A1 | 8/2002 | Stuart et al. |
| 2002/0101859 A1 | 8/2002 | Maclean |
| 2002/0160763 A1 | 10/2002 | Mittal et al. |
| 2002/0187780 A1 | 12/2002 | Souissi |
| 2002/0191575 A1 | 12/2002 | Kalavade et al. |
| 2002/0191755 A1* | 12/2002 | Lew et al. ............ 379/88.12 |
| 2002/0196775 A1 | 12/2002 | Tuohino et al. |
| 2003/0017843 A1 | 1/2003 | Noblins |
| 2003/0032413 A1* | 2/2003 | Aksu et al. ............ 455/415 |
| 2003/0050047 A1 | 3/2003 | Ala-Luukko |
| 2003/0051041 A1 | 3/2003 | Kalavade et al. |
| 2003/0064723 A1 | 4/2003 | Thakker |
| 2003/0069922 A1 | 4/2003 | Arunachalam |
| 2003/0101210 A1* | 5/2003 | Goodman et al. ............ 709/202 |
| 2003/0128821 A1* | 7/2003 | Luneau et al. ............ 379/88.21 |
| 2003/0129991 A1 | 7/2003 | Allison et al. |
| 2003/0133421 A1 | 7/2003 | Sundar et al. |
| 2003/0139180 A1 | 7/2003 | McIntosh et al. |
| 2003/0208560 A1 | 11/2003 | Inoue |
| 2003/0224795 A1 | 12/2003 | Wilhoite et al. |
| 2003/0229791 A1 | 12/2003 | De Jong |
| 2004/0019539 A1 | 1/2004 | Raman et al. |
| 2004/0053610 A1 | 3/2004 | Kim |
| 2004/0082346 A1 | 4/2004 | Skytt et al. |
| 2004/0087305 A1 | 5/2004 | Jiang |
| 2004/0120552 A1 | 6/2004 | Borngraber et al. |
| 2004/0131023 A1 | 7/2004 | Auterinen |
| 2004/0132449 A1 | 7/2004 | Kowarch |
| 2004/0148400 A1 | 7/2004 | Mostafa |
| 2004/0171372 A1* | 9/2004 | Tokudome ............ 455/415 |
| 2004/0196858 A1 | 10/2004 | Tsai et al. |
| 2004/0224680 A1 | 11/2004 | Jiang |
| 2004/0229601 A1 | 11/2004 | Zabawskyj et al. |
| 2004/0236836 A1 | 11/2004 | Appelman |
| 2005/0021834 A1 | 1/2005 | Coulombe |
| 2005/0047378 A1 | 3/2005 | Wuschke et al. |
| 2005/0064883 A1 | 3/2005 | Heck et al. |
| 2005/0065876 A1* | 3/2005 | Kumar ............ 705/39 |
| 2005/0070278 A1 | 3/2005 | Jiang |
| 2005/0186939 A1 | 8/2005 | Barnea et al. |
| 2005/0186960 A1 | 8/2005 | Jiang |
| 2005/0186979 A1 | 8/2005 | McCann et al. |
| 2005/0192035 A1 | 9/2005 | Jiang |
| 2005/0215250 A1 | 9/2005 | Chava et al. |
| 2005/0232282 A1 | 10/2005 | Silver et al. |
| 2005/0250493 A1 | 11/2005 | Elkarat et al. |
| 2006/0003775 A1 | 1/2006 | Bull et al. |
| 2006/0009204 A1 | 1/2006 | Ophir |
| 2006/0025129 A1 | 2/2006 | Wolfman et al. |
| 2006/0052113 A1 | 3/2006 | Ophir et al. |
| 2006/0068778 A1 | 3/2006 | Della-Torre |
| 2006/0068786 A1 | 3/2006 | Florence |
| 2006/0079225 A1 | 4/2006 | Wolfman et al. |
| 2006/0079236 A1 | 4/2006 | Del Pino et al. |
| 2006/0148459 A1 | 7/2006 | Wolfman et al. |
| 2006/0205404 A1 | 9/2006 | Gonen et al. |
| 2006/0211420 A1 | 9/2006 | Ophir et al. |
| 2007/0021118 A1 | 1/2007 | Ophir et al. |
| 2007/0049269 A1 | 3/2007 | Ophir et al. |
| 2007/0054665 A1 | 3/2007 | Elkarat et al. |
| 2007/0072587 A1 | 3/2007 | Della-Torre et al. |
| 2007/0178885 A1 | 8/2007 | Lev et al. |
| 2007/0184822 A1* | 8/2007 | Huotari ............ 455/415 |
| 2007/0232300 A1 | 10/2007 | Wolfman |
| 2007/0259663 A1 | 11/2007 | Weintraub et al. |
| 2008/0020760 A1 | 1/2008 | Elkarat et al. |

FOREIGN PATENT DOCUMENTS

| | | |
|---|---|---|
| GB | 2322998 | 9/1998 |
| WO | WO 98/26621 A2 | 6/1998 |
| WO | WO 98/26626 A2 | 6/1998 |
| WO | WO 00/18156 A1 | 3/2000 |
| WO | WO 00/51375 A | 8/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/019667 | 7/2002 |
| WO | WO 03/019960 A1 | 3/2003 |
| WO | WO 03/043367 A | 5/2003 |
| WO | WO 03/085660 A | 8/2003 |
| WO | WO 2004/081802 | 9/2004 |
| WO | WO2004/075598 | 9/2005 |
| WO | WO2005/101857 | 10/2005 |
| WO | WO2008/012815 | 1/2008 |

OTHER PUBLICATIONS

"Digital Cellular Telecommunications system (Phase 2+); Universal Mobile Telecommunications system (UMTS); General Packet Radio

(56) References Cited

OTHER PUBLICATIONS

Service (GPRS) Service description; Stage 2 (3GPP TS 23.060 Version 5.4.0 Release 5)" ETSI TS 123 060 V5.4.0, Dec. 2002, pp. 1-207 (XP-014007573).
"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002. pp. 1-102 (XP-002298277).
Ala-Laurila, et al., "Wireless LAN Access Network Architecture for Mobile Operators," IEEE Communications Magazine, Nov. 2001, pp. 82-89 (XP-001107810).
GSM Association Permanent Reference Document: IR.33, PRD IR.33 "GPRS Roaming Guidelines," version 3.2.0. Apr. 3, 2003. pp. 1-20 (XP-002298278).
Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).
"Universal Mobile Telecommunications system (UMTS) NAS Functions Related to Mobile Station MS in Idle Mode" ETSI TS 123 122 V3.1.0, Jan. 2000. pp. 1-33.
"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.
Salman A. Baset et al., "An analysis of the Skype Peer-to-Peer Internet Telephony Protocol", Department of Computer Science, Sep. 15, 2004, 12 pages.
Salkintzis, et al., "WLAN-GPRS Integration for Next-Generation Mobile Data Networks," IEEE Wireless Communications. Oct. 2002, pp. 112-123 (XP-001132263).
Michael Mouly, "The GSM System for Mobile Communications", pp. 103-104. Cell and Sys, 1992.
GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).
GSM978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).
GSM 902 on MAP Specification Digital Cellular Telecommunications (Phase 2+); Mobile Application Part (MAP) Specification (3GPP TS 09.02 version 7.9.0 Release 1998).
Q760-Q769 on ISUP Signaling, Function and Procedure.
Q.761 (Functional description of the ISDN User Part of CCITT Signaling System No. 7).
Q762 (General Functions of CCITT Signaling System No. 7 ISDN User Part Messages and parameters).
Q 763 (Formats and codes of CCITT Signaling System No. 7 ISDN User Part Message and parameters).
Q 764 (1999), Signaling System No. 7—ISDN User Part signaling procedures.
Q 730 (1999), ISDN User Part supplementary services.
Q 711 (1996), Functional description of signaling connection control part.
Q 712 (1996), Definition and function of signaling connection control part messages.
Q713 (1996), Signaling connection control part formats and codes.
Q 714 (1996), Signal connection control part procedures.
Q 716 (1993), Signaling Connection Control Part (SCCP) performance.
GSM 340 on SMS Digital cellular telecommunications system (Phase 2+); Technical realization of the Short Message Service (SMS): (GSM 03.40 version 7.4.0 Release 1998).
SMPP Forum: SMPP Protocol Document Version:—Oct. 12, 1999 Issue 1.2.
Universal Mobile Telecommunications System (UMTS); Multimedia Messaging Service (MMS), Functional description; Stage 2 (3GPP TS 23,140 version 4.2.0 Release 4).
GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).
Technical Specification3[rd] Generation Partnership Project; Technical Specification Group Services and System Aspects; Service accessibility (Release 1999).
Signaling procedure and the Mobile Application Part (MAP) (Release 1999).
Q1214-Q1218 on Intelligent Networks IMS architectures, 3GPP, and 3GPP2.
GMS 408 on radio interface layer 3; Digital cellular telecommunications system (Phase 2+); Mobile radio interface layer 3 specification (GSM 04.08 version 7.4.2 Release 1998).
GSM 322 network selection Digital cellular telecommunications sytems (Phase 2+); functions related to Mobile Station (MS) in idle mode and group receive mode (GSM 03.22 version 8.3.0 Release 1999).
GSM 23122 network selection 3GPP TS 23.122 V3.9.0 (Dec. 2002) Technical Specification; 3rd Generation Partnership Project; Technical Specification Group Core Network; NAS Functions related to Mobile Station (MS) in idle mode (release 1999).
GSM 22011 service accessibility; 3 GPP TS 20.011 V3.8.0 (Sep. 2002) Technical Specification; 3rd Generation Partnership Project; Technical Specification Group Services and System Aspects; Service accessibility (Release 1999).
3 GPP 29010; 3 GPP TS 29.010 V3.10.0 (Dec. 2002); Technical Specification; 3rd Generation Partnership Project; Technical Specification Group Core Network; Information element mapping between Mobile Station-Base Station System (MS-BSS) and Base Station System-Mobile-services Switching Centre (BSS-MSC): Dec. 2012.
GSM 318 on CAMEL Basic Call Handling; Digital cellular telecommunications system (Phase 2+) Basic call handling; Technical realization (GSM 03.18 version 6.6.0 Release 1997).
ITU-T Recommendation Q. 766 (1993), Performance objectives in the integrated services digital network application.
ITU-T Recommendation Q. 765 (1998), Signaling system No. 7—Application transport mechanism.
ITU-T Recommendation Q. 769.1 (1999), Signaling system No. 7—ISDN user part enhancements for the support of Number Portability.
Q771-775X TCAP.
GSM 1111 SIM and Mobile Interface.
GSM 1114 SIM Toolkit.
IR 7320 Steering of Roaming.
GSM 348 Security and OTA.
GSM 31048 Security and OTA.
GSM 23119 Gateway Location Register.
GSM 408 Mobile Radio Interface Network Layer.
GSM 23122 Mobile Station Procedure.
GSM 24008 Mobile Radio Interface Network Layer.
GSM 25304 Idle Mode Selection.
GSM 29010 Error Network Mapping.
GSM 29002 MAP Protocol.
3G TS 22.078 version 3.2.0 Release 1999 UMTS CAMEL.
3G TS 23.278 version 6.0.0. Release 6 UMTS CAMEL-IMS Interworking.
GSM 360 GPRS.
GSM 960 GPRS Tunneling Protocol.
GSM 23060 GPRS.
GSM 29060 GPRS Tunneling Protocol.
GSM 23012 Location Update.
Q701-705 on SS7 MTP.

* cited by examiner

FLASH CALLER ID FOR ROAMING

CROSS-REFERENCE TO RELATED APPLICATION

This application claims priority from the U.S. Provisional Patent Application Ser. No. 60/618,500 filed Oct. 12, 2004, and entitled, "FLASH CALLER IDENTIFICATION FOR MOBILE TERMINATING CALLS TO OUTBOUND ROAMERS" This patent application constitutes the conversion of that Provisional Patent Application into a non-provisional patent application.

BACKGROUND OF THE INVENTION

Field of the Invention

This invention relates to methods and apparati by which the mobile station of a telecommunications subscriber can receive from the home network, and instantly display, information about the present calling party when receiving a call via a visited telecommunications network.

Today, a telecommunications session via a common carrier telecommunications network such as a mobile terminating (MT) call to mobile subscribers communicating via a network to which they normally subscribe (the "home network") normally can present caller identification (CLI) to the subscriber's telecommunications device, provided the CLI of the MT call is received at the subscriber's home network and CLI is not restricted. However the same presentation is not available if the receiving subscribers are communicating via a visited network, such as roaming in a mobile network other than their home network.

While generally, the examples and explanations in this patent application relate to providing this convenience to mobile telecommunications subscribers who are receiving phone calls via a visited mobile network, the invention may be implemented or embodied in any telecommunications situation in which a user is receiving a request for a telecommunications session via any telecommunications network other than the network to which he subscribed. Without limiting the foregoing, the present invention would be of equal relevance to a "voice over IP" service or other long-distance subscribers receiving calls through points of presence made available by parties other than his original service subscriber.

In the absence of the present invention, here are four solutions currently available to deal with the unavailability of caller-ID information in visited networks.

1. Select an international carrier or set up direct link between HPMN and VPMN that can guarantee caller ID delivery for outbound roaming calls. But this solution is limited to a few locations, where the home and visited carrier have made special prior arrangements, and is costly and inefficient to implement, including complicated internetwork logistics. Availability also would depend upon complicated interconnections across the globe which might not even be possible for some countries due to monopoly-carrier and regulatory restrictions. Furthermore, many operators (trunk carriers or terminating operators) or countries for whatever reason (e.g. China) strip off the delivery of CLI to inbound roamers.

2. Upgrade GMSC and HLR to support receiving CLI in MAP location request (e.g. GSM MAP SRI signaling additional information [GSM 902], ANSI-41 MAP LocationRequest calling number [ANSI-41]) and to have the HLR send CLI in MAP routing number request (e.g. GSM MAP PRN signaling additional information [902], ANSI-41 MAP Routing Request calling number [ANSI-41]) to the VLR. But not only can this be a very expensive solution, it also generally depends upon whether the visited network has made a business arrangement with the home network, and whether the visited network's VLR can correctly process the CLI parameter of the HLR routing number request message.

3. Send a missed call CLI after the call. While this is useful for the situation in which, for example, a roaming subscriber's handset is switched off, and then later powered-on, for handsets that are on, receiving CLI information after the call would be too late for the recipient to decide to take the call or not.

4. Suspending the MT call at home network by sending CLI to a recipient mobile client application and wait for instruction sent back to home network from the client in order to continue the call. While this is very powerful to do many call control functions (such as call forwarding) beyond CLI, it complicates the user interface and requires a client application at the receiving device which will be an expensive and logistically complex process even if it is possible. In any event, the user's experience will be quite different and more complicated than the normal experience of CLI displayed on the mobile station before accepting the incoming call.

There remains a need in the art for displaying caller identification (CLI) at the telecommunications station of the subscriber, while that station is connecting via a visited network, wherein that CLI is displayed with little or no interaction by the subscriber, prior to the subscriber accepting the identified call.

SUMMARY OF THE INVENTION

This patent application describes a simple but cost effective solution for delivering MT call CLI to outbound roamers.

While generally, the examples and explanations in this patent application relate to providing this convenience to mobile telecommunications subscribers who are receiving phone calls via a visited mobile network, the invention may be implemented or embodied in any telecommunications situation in which a user is receiving a request for a telecommunications session via any telecommunications network other than the network to which he subscribed. Without limiting the foregoing, the present invention would be of equal relevance to a "voice over IP" service or other long-distance subscribers receiving calls through points of presence made available by parties other than his original service subscriber.

Under the present invention, the subscriber's mobile station (or "handset") simply receives the CLI via signaling without necessarily suspending the MT call for user interactions. The handset receives the CLI out-of-band via a text message communication such as flash SMS directly over SS7 (for example, without going through an SMSC) from the home network. Flash SMS is a short message that can appear immediately on the screen of the mobile phone display without user interaction such as touching any of the keys on his handset.

Since transmitting that flash SMS of the CLI ("Flash CLI") is controlled at the home network, the method does not depend on arrangements with, or additional facilities or interfaces operating at the visited or other intermediary networks. This method under the current invention also does not depend on additional capabilities or computer programs being present or installed at the receiving devices or handset. Unlike typical "missed call alert" type services which send CLI after a call, the flash CLI method of the present invention displays the pre-call CLI to the outbound roamer's handset before the call arrives at the handset, or before that roamer accepts the incoming call.

Note that this flash CLI method need not guarantee caller ID delivery for MT calls to outbound roamers. The method only guarantees so-called VHE (Virtual Home Environment) for caller ID delivery. the object of the present invention is to provide subscribers with the same type of calling experience as they enjoy when receiving calls directly from their home network, but when roaming in a visited network. So for example, if when connecting via the home network, that subscriber normally can receive caller ID before accepting a call; under the present invention, he should receive the caller ID even if he is receiving the call outside of the home network.

The flash CLI service will "fake" the sender ID of the flash SMS message, by replacing that sender ID with that of the caller ID of the calling party.

The SMS content could be "<CLI> is calling next".

Under normal handset conventions, the sender ID of the flash-SMS message used in the present invention could also be expected to trigger the phone book to present the name of the calling party if the CLI is defined in the phone book of the receiving device.

In one embodiment of the present invention, flash CLI service delivers CLI as a flash SMS over SS7 directly rather than USSD. In other embodiments of the present invention, it could also be possible to utilize USSD for that. But some operators and some types of devices might not support network-initiated USSD. Furthermore, the USSD interface may be less familiar to some subscribers. More importantly, USSD may not support the flash capability of some handsets which will allow the recipient to decide to store or discard the message via one key touch. Flash SMS can also be easily extended to support enhanced features of Flash CLI such as invoking reply from the user to continue the call handling at the network side.

Flash CLI is an out-of-band solution to CLI delivery to outbound roamers. It is independent of the signaling for call set up which can be blocked by either visiting countries/operators or intermediate operators/carriers (via some kind of black boxes). Flash CLI can be controlled via a blacklist/whitelist procedure to apply only in certain outbound roaming countries where CLI is not delivered or not guaranteed. Because the present invention delivers CLI via a "flash" (a message that does not require user interaction to display at the receiving station), Flash CLI can be used to augment existing non-guaranteed CLI delivery to certain destinations without substantially altering the user experience.

The Flash CLI method of the present invention can complement, but differ from the typical roaming missed call alert methods available in the art. Typically, roaming missed call alert mainly functions to send CLI for cases when the out-of-network subscriber station is turned off, is out of the coverage area, or is otherwise unavailable. While it also covers calls missed when not answering or busy, those alerts of the current art are only sent after the call.

Contrasted with those typical missed-call-alert methods, Flash CLI presents caller identification information prior to the call answered, not after the call is missed. If the call is missed, or unsuccessful, the Flash CLI is still presented at the handset, and optionally stored there, so it would not necessarily need to be sent again as a roaming missed call alert.

Among other features, here are some specific unique embodiments available under the present invention:

1. Presenting caller ID of an incoming call to the called party via a different path from the call path to the called party.

2. Using the SS7 MAP interface rather than ISUP interface to deliver the Caller ID out of band of call path between calling party and called party 3. Using a flash SMS to carry the caller ID 4. Using the direct SS7 MAP interface to communicate with the VLR/VMSC of the called rather than going thru SMSC to deliver the flash SMS carrying the caller ID 5. Substituting the sending-party-identifier of the flash CLI to actually comprise the CLI itself, so that the phone book of the receiving party can still be properly invoked for the name of the caller.

6. Making the flash CLI dynamic, by presenting or displaying the flash CLI repeatedly in a configurable interval so that the flash SMS does not get overwritten before the recipient can see the caller ID 7. Enhancing the flash CLI by sending CLI and an SMS menu to the recipient as a normal SMS rather than a flash SMS so that the reply of the SMS by the recipient will dictate further actions (including time-out actions) from the Flash CLI system.

8. Utilizing a Terminating Camel (T-CSI) approach for implementing the Flash CLI 9. Utilizing a proxy approach to handle interactions with other T-CSI-based applications 10. Utilizing an intelligent network ("IN") approach for implementing the Flash CLI 11. Utilizing an ISUP approach for implementing the Flash CLI Although the technical approaches described follow GSM world, similar approaches can be applied to ANSI-41 (CDMA, TDMA), VoIP world or 3G world.

DETAILED DESCRIPTION OF THE INVENTION

The following detailed description of the present invention draws on references, examples, terminology and concepts from the art of GSM-based wireless common carrier telecommunications. But it will be appreciated that this manner of describing possible embodiments does not limit the scope of the present invention. The present invention may be implemented in any method of telecommunications in which information relevant to identifying the calling party is displayed for the end-user regardless of the fact that his telecommunications terminal is remote from his "home" or accustomed telecommunications network.

One exemplary embodiment of a Flash CLI service can consist of two phases, either of which may be considered inventive. In a capture phase, the service intercepts the MT call signaling destined for an outbound roamer and captures caller ID, VMSC and MSISDN/IMSI of outbound roamer. In a receipt and display phase, the CLI is presented to the mobile station and displayed to the user via an out-of band medium such as a flash SMS or directly over SS7.

In some mobile handsets, (all Nokias, some Siemens, Ericsson, Motorola etc.) a class 0 message in the SMS message encoding will appear as a flash SMS message. These messages appear on the screen immediately upon arrival, without the need to press any buttons on the phone. If the data coding scheme is set to 16-bit unicode (ucs2), and the message starts with "0001", it will appear as a blinking flash message. The detailed encoding of this type of Flash SMS embodiment is described in Section 2.5, below. But for the purposes of this specification, flash SMS can just be understood as text message that immediately appears on the display of the subscriber's telecommunications device, even without interaction by the user.

Figure 6:
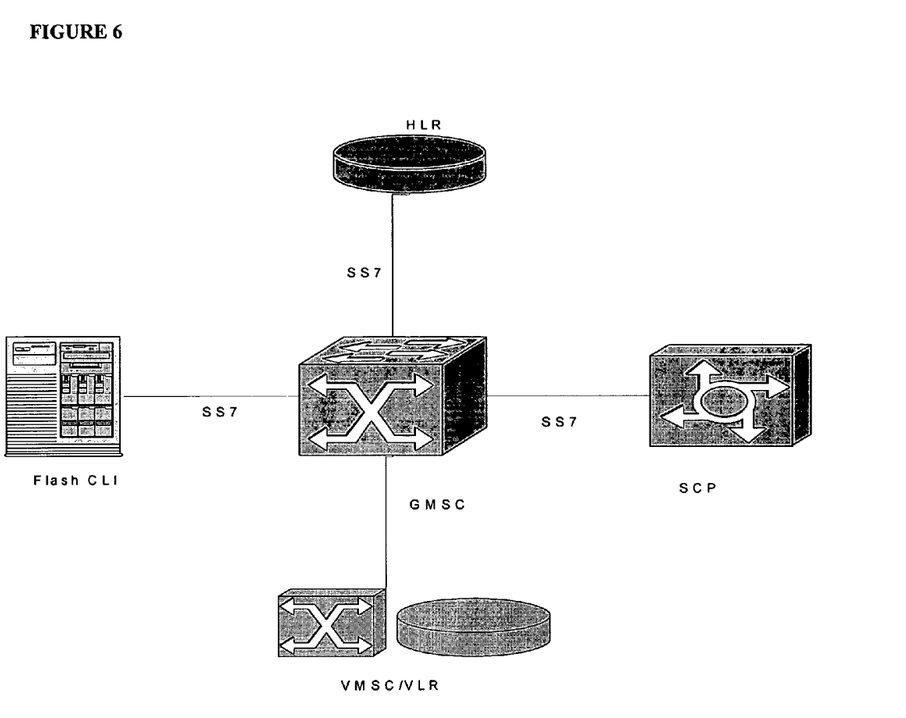
FIG. 6 illustrates the topography of an exemplary telecommunications network upon which an embodiment of the present invention can be implemented.

In one embodiment of the present invention, flash CLI is expected to be deployed on a system that is connected to HPMN GMSC via SS7. FIG. 6 is a basic logical depiction of that network topography In actual deployment, there could be redundant active/active components with a single Signal Point Code (SPC) with duplicated transactional states.

1.1 Intercept MT Call Signaling

This specification now references two basic embodiments of intercepting MT call signaling phase in the present invention. One is Camel/IN-based. The other is ISUP-based.

1.1.1 Camel/IN-Based

In this embodiment of the CLI data capture phase, interception will be based on terminating Camel/IN triggers. When an MT call is made to an outbound roamer, the HPMN GMSC can query the HLR which can return the terminating trigger. The Trigger can be issued via InitialDP to a network element (Flash CLI element) that originates a flash CLI message of the present invention. That flash CLI element will capture the caller ID, VMSC, IMSI/MSISDN of the outbound roamer who is the called party. That flash CLI element can then issue Camel/IN Continue to GMSC-H and send MAP MT FowardSMS to the captured VMSC with captured CLI and IMSI.

Since a home network may or may not incorporate existing terminating Camel/IN triggers for some subscribers (e.g. prepaid), we will describe two approaches. One is based on a new trigger. The other is based on an existing trigger.

1.1.1.1 New Camel/IN Trigger

Figure 1:
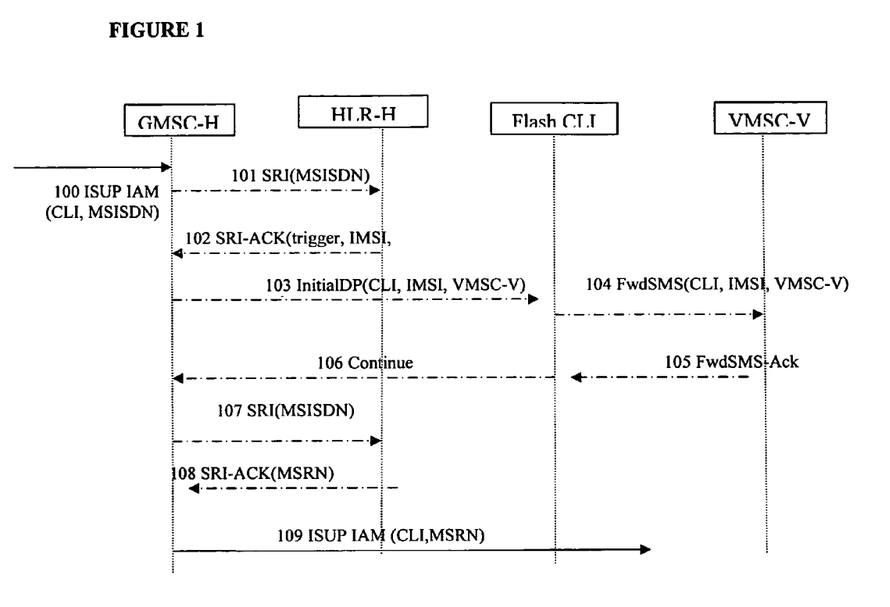
FIG. 1 depicts the signal flow for an embodiment of the present invention wherein a home network has implemented a new Camel/IN-based trigger.

Referring to FIG. 1, a new Camel/IN-based trigger (e.g. T-CSI) is defined at a home network for a subscriber at the HPMN HLR. The trigger is only sent as part of an ACK to HPMN GMSC when the subscriber is roaming outside of the home network (outbound roaming).

Referring to FIG. 1, that exemplary signal flow can be as follows:

100 CLI calls MSISDN where MSISDN is roaming at VMSC-V. The MT call reaches HPMN GMSC-H

101 GMSC-H issues SRI(MSISDN) to HLR-H

102 Because MSISDN is roaming, HLR-H returns the terminating Camel/IN trigger to GMSC-H,

103 GMSC-H issues InitialDP to Flash-CLI system. The InitialDP can contain VMSC-V, MSISDN/IMSI. IMSI can be sent in Camel InitialDP and some IN variants. If IMSI/VMSC is not received, Flash-CLI element will issue SRI-SM on MSISDN to HLR-H to get IMSI and VMSC-V

104 Flash-CLI element issues MT FwdSMS(CLI, IMSI, VMSC) to VMSC-V

105 VMSC-V returns MT-FwdSMS-ACK to Flash-CLI

106 Flash-CLI element issues Continue to GMSC-H. This can also be issued immediately after FwdSMS is sent rather than after FwdSMS-ACK is received. Alternatively, Continue can be issued immediately before SRI-SM/MT-ForwardSMS in order to let the flash CLI appear after the call set up. Or it can also involve a configurable hold time period before issuing Continue in order to let the flash CLI appear before the call set up. The Flash CLI can also be configured to be sent repeatedly to the outbound roamer's handset in a configurable interval.

107 GMSC-H issues SRI to HLR-H again with Camel/IN trigger suppressed

108 HLR-H returns MSRN to GMSC-H

109 GMSC-H sets up the call via IAM(CLI, MSRN)

1.1.1.2 Existing Camel/IN Trigger

Figure 2:
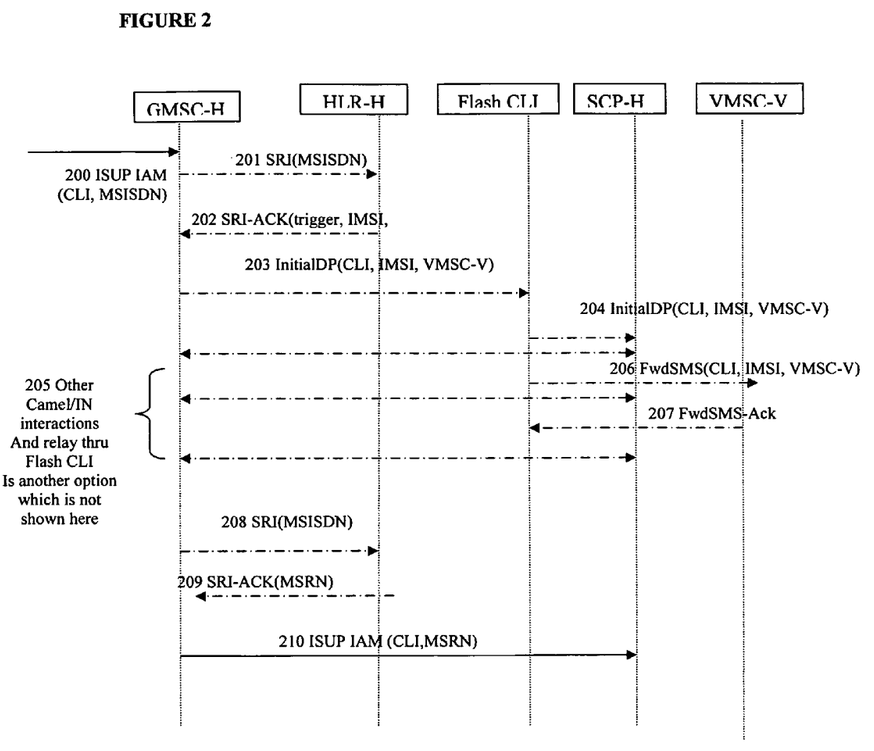
FIG. 2 depicts the signal flow for an embodiment of the present invention leveraging an existing Camel/IN-based trigger with respect to the home network.

Referring to FIG. 2, in some cases, the home operator already has defined a suitable Camel/IN-based trigger (e.g. T-CSI) for a subscriber at the HPMN HLR. The trigger might be defined for both home and outbound roaming, e.g. prepaid is defined for both home and outbound roaming. To avoid signaling load onto the Flash CLI element, the operator can also separate home and outbound roaming terminating triggers by defining a new trigger for outbound roaming such as that described in the preceding section. In this section, we just assume an existing trigger is used.

The basic idea in this embodiment is to use SCCP routing to pass the terminating trigger via Flash CLI system without modifying any SCCP parameters. In this way, subsequent interactions will be between SCP and GMSC-H without involving a Flash CLI element. However in the first pass thru, the Flash CLI element will have already captured CLI, IMSI/MSISDN and VMSC parameters. If VMSC is a roaming one, the Flash CLI element will then send the CLI via Flash SMS directly over SS7.

However depending on applications (exemplary situations are discussed below) variations, this can also be achieved by relaying TCSI thru the Flash CLI element such that all interactions between SCP and GMSC-H will be relayed thru the Flash CLI element.

Referring to FIG. 2, such an exemplary signal flow can be as follows:

200 CLI calls MSISDN where MSISDN is roaming at VMSC-V. The MT call reaches HPMN GMSC-H

201 GMSC-H issues SRI(MSISDN) to HLR-H

202 HLR-H returns the terminating Camel/IN trigger to GMSC-H

203 GMSC-H issues InitialDP via SCCP addressing with a non-zero translation type. Without changing SCCP CdPA and Routing Indicator, the DPC of the existing trigger SCP address in the non-zero translation type will be set to Flash-CLI system. The InitialDP will contain VMSC-V, MSISDN/IMSI. IMSI is sent in Camel InitialDP and some IN variants. If IMSI/VMSC is not received, Flash-CLI system will issue SRI-SM on MSISDN to HLR-H to get IMSI and VMSC-V

204 After capturing these parameters, Flash CLI will simply send the SCCP message to the SPC of the SCP with translation type 0. The SCP should send SCCP messages back to GMSC-H using translation type 0. GMSC can send SCCP messages to CdPA of SCP in translation type 0 to the SPC of SCP. In this way, subsequent Camel/IN interactions between GMSC-H and SCP can bypass the Flash CLI element. Note all these arrangements on translation types are not fundamental to the technical approach but are intended to reduce the signaling load to Flash CLI element. If translation type is not supported, then only all Camel/IN commands from the GMSC side to SCP will come to the Flash CLI element.

205 All Camel/IN commands between the SCP side and GMSC may or may not come thru the Flash CLI element. Only if it is permitted to suspend the call for a while to give time for a flash CLI message, then it may be preferred for SCP commands to come thru the Flash CLI element.

206 Flash-CLI element issues FwdSMS(CLI, IMSI, VMSC) to VMSC-V.

207 VMSC-V returns FwdSMS-ACK to the Flash-CLI element.

208 The Flash-CLI element does not issue Continue to GMSC-H in the case of existing trigger. Instead the SCP will determine whatever its commands and control with GMSC-H require. Subsequent signal flow can be based on the assumption that SCP issues Continue to GMSC-H. Alternatively, Continue can be issued immediately before SRI-SM/MT-ForwardSMS in order to let the flash CLI appear at the roaming handset after the call set up. Or it can also have a configurable hold time period before issuing Continue in order to let the flash CLI appear prior to call set up at the roaming handset. Or that flash-CLI element can also be configured to send CLI repeatedly within a configurable interval. Assuming SCP issues Continue to GMSC-H or to the Flash CLI element which (might hold a while) will then relay to GMSC-H, then GMSC-H issues SRI to HLR-H again with Camel/IN trigger suppressed 209 HLR-H returns MSRN to GMSC-H 210 GMSC-H sets up the call via IAM(CLI, MSRN)

1.1.2 ISUP-Based

In an alternative embodiment of the present invention, interception can be based on defining ISUP loopback circuits at the GMSC-H for international MSRN where loopback circuits are going thru the GMSC-H and ISUP signaling is passing thru the Flash CLI element.

When a normal MT call is made to an outbound roamer, the HPMN GMSC can query the HLR which will return the international MSRN. The GMSC can issue ISUP IAM signaling on the international MSRN to the Flash CLI element. The ISUP IAM message should contain CLI of the calling party, MSRN/MSISDN of the outbound roamer. The flash CLI element can capture the caller ID and find out the IMSI, VMSC and MSISDN of the destined outbound roamer. It can then issue ISUP IAM(CLI, MSRN) via ISUP loopback signaling and send MAP MT FowardSMS to the discovered VMSC with captured CLI and discovered IMSI.

Figure 3:
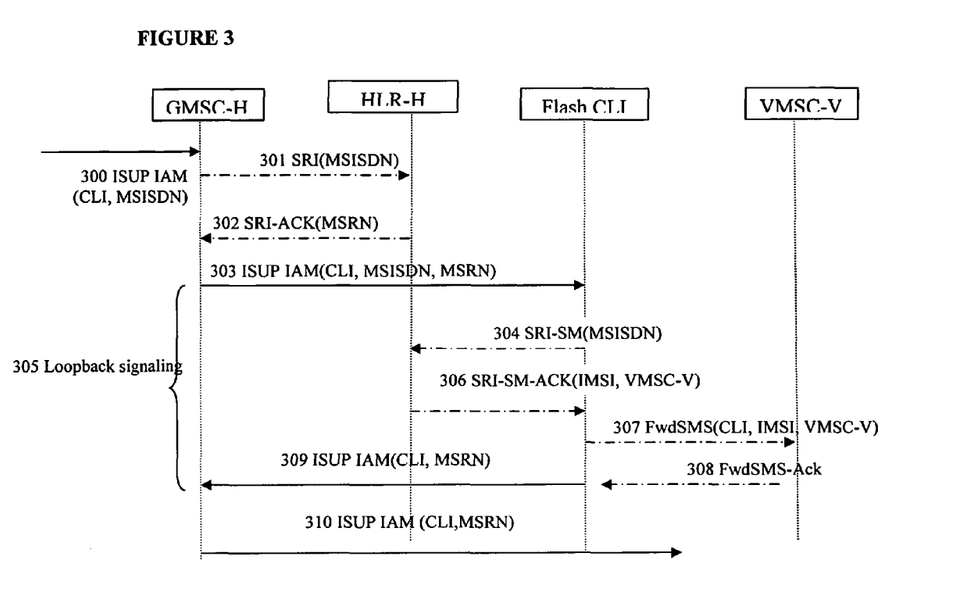
FIG. 3 depicts the signal flow for an embodiment of the present invention based on defining ISUP loopback circuits at the GMSC-H for international MSRN where loopback circuits are going thru the GMSC-H and ISUP signaling is passing thru the Flash CLI system.

Referring to FIG. 3, that exemplary signal flow can be as follows:

300 I calls MSISDN where MSISDN is roaming at VMSC-V. The MT call reaches HPMN GMSC-H 301 GMSC-H issues SRI(MSISDN) to HLR-H 302 HLR-H returns international MSRN to GMSC-H 303 GMSC-H issues ISUP IAM on international MSRN to a Flash CLI element. If the IAM message contains MSISDN as some vendors' switches can support this, the Flash CLI element can then find out IMSI and VMSC-V via SRI-SM to the HLR-H. Alternatively if, for example, a roaming probe exists, the Flash CLI element can find out this information from a probe roamer DB. For example a probe available from Roamware, Inc. comprises such a probe. Such a probe taps international roaming links between GMSC-H/STP-H and ISG on MAP LUP(IMSI, VMSC-V), ISD(IMSI, MSISDN) and PRN(IMSI, MSRN) messages to find out the correlation of the IMSI, VMSC-V, MSISDN, MSRN etc.

304 If MSISDN is received from the IAM message, the Flash-CLI element can also issue SRI-SM on MSISDN to HLR-H to get IMSI and VMSC-V 305 Other ISUP loop signaling messages 306 HLR sends back SRI-SM-ACK to Flash CLI system 307 Flash-CLI system issues FwdSMS(CLI, IMSI, VMSC) to VMSC-V 308 VMSC-V returns FwdSMS-ACK to Flash-CLI 309 Flash-CLI issues ISUP IAM(CLI, MSRN) to GMSC-H. This can also be issued immediately after MAP MT FwdSMS is sent rather than after FwdSMS-ACK is received. Alternatively, IAM can be issued immediately before SRI-SM/MT-ForwardSMS so to let the flash CLI appear after the call set up. Or It can also have a configurable hold time period before issuing IAM so to let the flash CLI appear a while before the call set up.

310 GMSC-H sets up the call via IAM(CLI, MSRN)

1.1.3 Camel/IN Vs. ISUP Approach

The ISUP approach is independent of switches, HLRs and Camel/IN triggers. It also does not require Camel/IN support from the operator infrastructure. But it requires more circuit resources due to loopback circuits and additional signal processing since IMSI and VMSC-V are not captured. If MSISDN is not sent, it will also require roaming probe support and add additional cost.

Camel/IN approach does not involve loopback circuits and has IMSI and VMSC-V support, and hence in some instances may be more efficient and cost effective. But it might need to deal with existing triggers via a one-way relay function.

1.2 Flash CLI User Interface Issues and Dynamic Flash CLI Delivery

The basic Flash CLI solution delivers CLI as soon as a Flash CLI element obtains it from the GMSC via IDP. Since call set up varies according to VPMN and also sometimes it may be better to deliver Flash CLI during the ring rather than before the ring to avoid overwritten, a dynamic Flash CLI delivery is devised here.

Figure 4:
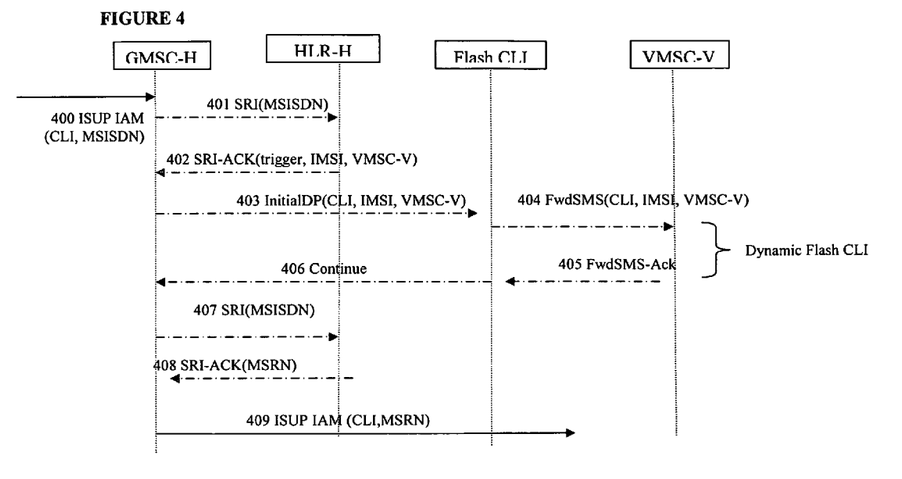
FIG. 4 depicts a flow of decisions and events in displaying a user interface aspect of the present invention.

Referring to FIG. 4, an exemplary signal flow relating to that can be as follows:

400 CLI calls MSISDN where MSISDN is roaming at VMSC-V. The MT call reaches HPMN GMSC-H 401 GMSC-H issues SRI(MSISDN) to HLR-H 402 Because MSISDN is roaming, HLR-H returns the terminating Camel/IN trigger to GMSC-H 403 GMSC-H issues InitialDP to the Flash-CLI element. The InitialDP will contain VMSC-V, MSISDN/IMSI. IMSI is sent in Camel InitialDP and some IN variants. If IMSI/VMSC is not received, the Flash-CLI element will issue SRI-SM on MSISDN to HLR-H to get IMSI and VMSC-V 404 The Flash-CLI element issues MT FwdSMS(CLI, IMSI, VMSC) to VMSC-V A dynamic flash CLI algorithm can be employed to determine when and how to present and display CLI based on a VPMN set of configurable parameters such as the following:

Present and display Flash CLI after delay interval (e.g. 5 secs)

Present and display Flash CLI a number of times (e.g. 3 times) using the delay interval for the first Flash CLI and send subsequent flash CLI after another configurable interval (e.g. 1 sec)

Present and display Flash CLI before issuing Continue or after issuing Continue to GMSC Issue Continue to GMSC only after Flash CLI presentation has succeeded at the outbound roamer's mobile station.

It is also possible to mix these settings, for example, to send Flash CLI after issuing Continue to GMSC first and after a delay interval.

405 VMSC-V returns MT-FwdSMS-ACK to Flash-CLI

406 Flash-CLI issues Continue to GMSC-H. This can also be issued immediately after FwdSMS is sent rather than after FwdSMS-ACK is received. Alternatively, Continue can be issued immediately before SRI-SM/MT-ForwardSMS so to let the flash CLI appear after the call set up. Or It can also have a configurable hold time period before issuing Continue so to let the flash CLI appear a while before the call set up. The Flash CLI can also be configured to be repeatedly sent to the receiving party in a configurable interval.

407 GMSC-H issues SRI to HLR-H again with Camel/IN trigger suppressed

408 HLR-H returns MSRN to GMSC-H

409 GMSC-H sets up the call via IAM(CLI, MSRN)

1.3 Flash CLI Enhancement

It is also possible to extend the basic Flash CLI solution by allowing user interactions to control the call flow. In this case, the MT call can be suspended by Flash CLI system when IDP is received from GMSC until either a reply is received from the user or time out. To achieve this, the flash CLI SMS will additionally set the SM-TP-Reply-Path to Flash CLI system's E164 address. Depending on the reply received, different actions can be performed.

Figure 5:
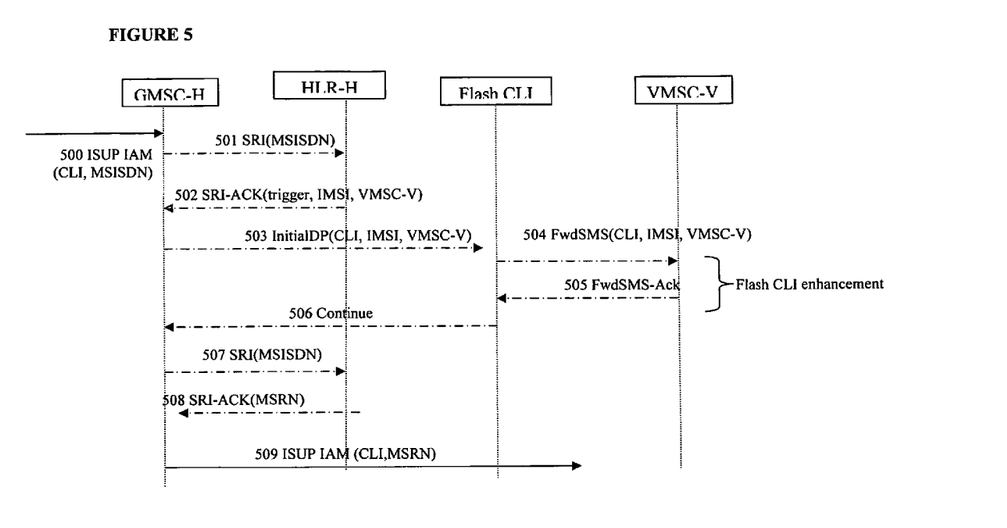
FIG. 5 depicts a flow of decisions and events in an embodiment of the present invention adding enhanced user features.

Referring to FIG. 5, the decision flow may be as follows:

500 CLI calls MSISDN where MSISDN is roaming at VMSC-V. The MT call reaches HPMN GMSC-H

501 GMSC-H issues SRI(MSISDN) to HLR-H

502 Because MSISDN is roaming, HLR-H returns the terminating Camel/IN trigger to GMSC-H

503 GMSC-H issues InitialDP to a Flash-CLI element. The InitialDP can contain VMSC-V, MSISDN/IMSI. IMSI is sent in Camel InitialDP and some IN variants. If IMSI/VMSC is not received, the Flash-CLI element will issue SRI-SM on MSISDN to HLR-H to get IMSI and VMSC-V

504 Flash-CLI system issues MT FwdSMS(CLI, IMSI, VMSC) to VMSC-V.

Such an enhanced Flash CLI element can send an SMS menu in a normal SMS message rather than a flash-type message in addition to the CLI. The menu will ask the recipient to reply with a number indicating the selection of a menu item. For example:

If the called party's selection is "ok" (1), then the Flash CLI element will issue Continue to GMSC If the called party's selection is "voicemail" (2), then the Flash CLI element will issue Connect(voicemail) to GMSC If the called party's selection is "RejectCall" (3), then the Flash CLI element will issue ReleaseCall to GMSC If reply is a long number, then Flash CLI system will issue Connect(long number) to GMSC In the following exemplary decision flow illustrated in FIG. 5, assume the called party has replied "1" or "OK".

505 VMSC-V returns MT-FwdSMS-ACK to Flash-CLI element.

506 Flash-CLI element issues Continue to GMSC-H. This can also be issued immediately after FwdSMS is sent rather than after FwdSMS-ACK is received. Alternatively, Continue can be issued immediately before SRI-SM/MT-ForwardSMS so to let the flash CLI appear after the call set up. Or It can also have a configurable hold time period before issuing Continue so to let the flash CLI appear a while before the call set up. The Flash CLI can also be configured to be repeatedly sent to the called party in a configurable interval.

507 GMSC-H issues SRI to HLR-H again with Camel/IN trigger suppressed

508 HLR-H returns MSRN to GMSC-H

509 GMSC-H sets up the call via IAM(CLI, MSRN)

1.4 Blacklist and Whitelist

Since an HPMN might have already delivered CLI of MT calls to an outbound roamer in some destination countries or networks, before gathering information for the CLI delivery under the Flash CLI method of the present invention, the Flash CLI element alternatively can analyze the country and visited network location of the outbound roamer before presenting the Flash CLI message.

In such an alternative embodiment, unless the country is in white list or enabled, and the network is not already CLI enabled, Flash CLI message would not be presented or displayed at the outbound roamer's handset.

Alternatively, a whitelist and blacklist can be defined for individual subscribers. For example, some subscribers might select a configuration under which they would not receive Flash CLI in which case they will be put in the blacklist at the Flash CLI element. A whitelist can be used for testing purpose too.

1.5 Flash CLI Packaging, Handset Display and Re-Delivery

A flash CLI element can use MAP MT FwdSMS in GSM-902 to present CLI using IMSI, VMSC and CLI captured, as further illustrated in the following table:

| MAP-MT-FORWARD-SHORT-MESSAGE | | | | |
|---|---|---|---|---|
| Parameter name | Request | Indication | Response | Confirm |
| Invoke Id | M | M(=) | M(=) | M(=) |
| SM RP DA | M | M(=) | | |
| SM RP OA | M | M(=) | | |
| SM RP UI | M | M(=) | C | C(=) |
| More Messages To Send | C | C(=) | | |
| User error | | | C | C(=) |
| Provider error | | | | O |

SM RP DA

This parameter can be filled with the captured IMSI. This parameter can be omitted in the mobile terminated subsequent SM transfers.

SM RP OA

The Flash CLI element Global Title can be inserted in this parameter. This parameter can omitted in the mobile terminated subsequent SM transfers.

SM RP UI

A short message transfer protocol data unit can be inserted in this parameter in the message. The content of SMS can be something like "<CLI> is calling next".

Where <CLI> is the captured CLI if Flash CLI element sends the flash CLI before it continues the call set up. If it is sent after the call is continued and held for a while, the message could be "<CLI> is calling".

The original sender MSISDN in the parameter can be set to the CLI captured and the short message type of the protocol-id is set to zero (the protocol id-byte set to 40 in BCD). Since the sender address is the CLI, the objective is that at the outbound roamer's handset, the phone book name will be popped up if the CLI has a name entry in the book. GSM 340 specifies that a short message type 0 indicates that the ME must acknowledge receipt of the short message but may discard its contents. Type 0 essentially indicates that the SMS is a flash SMS which will be displayed immediately without any key touch on the handset when the handset supports Flash SMS.

When a handset that supports Flash SMS receives the Flash CLI, the outbound roamer will be presented logically with a simple display with OK or Store buttons. If OK is selected, then the SMS is discarded. If Store is selected, the Flash CLI message can be selected for future reference.

When a handset that does not support Flash SMS receives the Flash CLI message, it will be presented as an ordinary SMS to the outbound roamer which will not be harmful other than a minor inconvenience if the outbound roamer wants to discard the message.

Because the Flash CLI SMS message indicates "<CLI> is calling next", when the subsequent call is received without CLI or dummy CLI, the outbound roamer at least has an idea who is calling next in order to accept or reject the call.

Since MT call always has to reach HPMN GMSC and then the Flash CLI system first, without local optimal routing, it is not possible or rare that different calls and their associated CLI arrive out of order.

User Error

A number of user errors are possible. However, ideally only Subscriber Busy and System Failure for re-delivery need be addressed in this explanation of the present invention.

Unidentified subscriber;
Absent Subscriber SM;
Subscriber busy for MT SMS;
Facility Not Supported;
Illegal Subscriber indicates that delivery of the mobile terminated short message failed because the mobile station failed authentication;
Illegal equipment indicates that delivery of the mobile terminated short message failed because an IMEI check failed, i.e. the IMEI was blacklisted or not white-listed;
System Failure;
SM Delivery Failure:
The reason of the SM Delivery Failure can be one of the following in the mobile terminated SM:
memory capacity exceeded in the mobile equipment;
protocol error;
mobile equipment does not support the mobile terminated short message service.
Unexpected Data Value;
Data Missing.

For System Failure or Busy Subscriber, it is up to the HPMN operator's deployment configuration, the Flash CLI element can retry a configurable number of times until it is successful or the configured limit has been reached. However to avoid Flash CLI being presented after the call is received, it may be preferred to set the Flash CLI element to wait for MT FwdSMS-ACK before issuing Continue or IAM back to the GMSC-H.

Since many types of out-of-call-path text messages, such as SMS can be received at a roaming handset even during a phone call, the Flash CLI method of the present invention is also a convenient method to alert outbound roamers of incoming or missed calls during a phone conversation.

Other Variations

Provided above for the edification of those of ordinary skill in the art, and not as a limitation on the scope of the invention are detailed illustrations of a scheme for presenting and displaying CLI to subscriber telecommunications stations functioning outside of the home or accustomed telecommunications carrier network. Numerous variations and modifications within the spirit of the present invention will of course occur to those of ordinary skill in the art in view of the embodiments that have now been disclosed. For example, while in the described embodiments, the present invention is implemented primarily from the point of view of common-carrier networks of voice telecommunications by mobile means, the present invention may also be effectively implemented for any facility capable of providing telecommunications via a home or accustomed network and via a visited or non-accustomed network.

The examples under the present Flash CLI invention detailed in the illustrative examples contained here are described using terms and constructs drawn largely from GSM mobile telephony infrastructure. But use of these examples should not be interpreted to limiting the invention to those media. Flash CLI—a method of providing caller-identifying information in a manner that is agnostic to the capabilities of the visited or non-accustomed network can be of use and provided through any type of telecommunications medium, including without limitation: (i) any mobile telephony network including without limitation GSM, 3GSM, 3G, PCS, TDMA, CDMA or CDMA 2000, satellite phones or other mobile telephone networks or systems; (ii) any so-called WiFi apparatus normally used in a home or subscribed network, but also configured for use on a visited or non-home or non-accustomed network, including apparati not dedicated to telecommunications such as personal computers, Palm-type or Windows Mobile devices; (iii) an entertainment console platform such as Sony Playstation, PSP or other apparati that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of Flash CLI under the present invention, this specification follows the path of a telecommunications call from a calling party to a subscriber or calling party. For the avoidance of doubt, that call can be for a normal voice call, in which the subscriber telecommunications equipment is also capable of visual, audiovisual or motion-picture display. Alternatively, those devices or calls can be for text, video, pictures or other communicated data.

Further, in describing certain embodiments of Flash CLI under the presentation, point to point, or single party to single party call paths are referenced for illustration. But Flash CLI under the current invention is not limited to single-point communications. The methods may be just as useful for the convenient display of caller-identifying information or participant information in multi-party conference calls, video-conference calls, or textual chat sessions.

I claim:

1. An apparatus for displaying information about a calling party to a called party comprising:
a mobile station of a telecommunications subscriber of a home network, the mobile station being present in a visited network;
means for receiving a call at the mobile station via a first path;
means for receiving information about the calling party, via a second path out of band from the first path, at the mobile station via the visited network mobile switching center (MSC), wherein the information is received at the visited network MSC independent of a home location register (HLR) of the home network, and independent of the signaling for setting up the call;
an element for presenting the information via the second path whenever a call is presented for processing by the home network, wherein the information is presented repeatedly in a configurable interval during ringing of the mobile station, the ringing associated with the call, prior to the subscriber accepting the call so the subscriber can view the information; and a third path for providing menu information of the call to the mobile station, wherein the third path is a short message service (SMS) message.

2. The apparatus of claim 1, wherein the subscriber selects the menu information to control the call.

3. The apparatus of claim 2, wherein the menu information includes continuing the call, sending the call to voicemail, and rejecting the call.

4. The apparatus of claim 1, wherein the configurable interval includes a delay interval presented a number of times.

5. The apparatus of claim 1, wherein a sender identification of the flash SMS is replaced with a caller identification of the calling party.

6. The apparatus of claim 1, wherein the second path comprises a flash short message service (SMS) message.

7. The apparatus of claim 1, wherein the second path uses a signaling system seven mobile application part interface.

8. A method for displaying information about a calling party to a called party's mobile station connected to a first network other than the called party's home network comprising:

receiving information about the calling party, via a visited network MSC, at the mobile station via a second path different from a first path of the incoming call, wherein the information is received at the visited network MSC independent of a HSR of the home network, and independent of the signaling for setting up the call;

displaying the information via the second path at the mobile station, wherein the information is presented repeatedly in a configurable interval during ringing of the mobile station, the ringing associated with the call, prior to the subscriber accepting the call so the called party can view the information: and receiving menu information of the call at the mobile station via a third path, wherein the third path is a short message service (SMS) message.

9. The method of claim 8, wherein the subscriber selects the menu information to control the call.

10. The method of claim 9, wherein the menu information includes continuing the call, sending the call to voicemail, and rejecting the call.

11. The method of claim 8, wherein the configurable interval includes a delay interval presented a number of times.

12. The method of claim 8, wherein a sender identification of the flash SMS is replaced with a caller identification of the calling party.

13. The method of claim 8, wherein the second path comprises a flash short message service (SMS) message.

14. The method of claim 8, wherein the information is captured outside of the first network.

15. The method of claim 8, wherein the second path uses a signaling system seven mobile application part interface.

* * * * *